(12) United States Patent
Lee

(10) Patent No.: US 9,595,904 B2
(45) Date of Patent: Mar. 14, 2017

(54) APPARATUS FOR MODIFYING VOLTAGE COMMAND FOR DETECTING OUTPUT CURRENT IN INVERTER

(71) Applicant: LSIS CO., LTD., Anyang-si, Gyeonggi-do (KR)

(72) Inventor: Eun Woo Lee, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/311,006

(22) Filed: Jun. 20, 2014

(65) Prior Publication Data

US 2015/0008860 A1 Jan. 8, 2015

(30) Foreign Application Priority Data

Jul. 2, 2013 (KR) .................. 10-2013-0076942

(51) Int. Cl.
*H02P 27/00* (2006.01)
*H02P 27/04* (2016.01)
(Continued)

(52) U.S. Cl.
CPC .......... *H02P 27/04* (2013.01); *H02M 7/5387* (2013.01); *H02M 7/5395* (2013.01);
(Continued)

(58) Field of Classification Search
USPC .... 318/400.33, 503, 71, 400.2, 400.01, 400, 318/22, 455, 718
See application file for complete search history.

(56) References Cited

U.S. PATENT DOCUMENTS 7,308,192 B2 * 12/2007 Williams ............ H02M 7/5387
318/606
2003/0173946 A1 9/2003 Liu et al.
(Continued)

FOREIGN PATENT DOCUMENTS

CN 1473391 2/2004
CN 101001076 7/2007
(Continued)

OTHER PUBLICATIONS

Cho et al "Voltage Injection Method for Boundary Expansion of Output Voltages in Three Shunt Sensing PWM Inverters," 8th international Conference on Power Electronics—ECCE Asia, May 2011, 5 pages.*
(Continued)

*Primary Examiner* — Eduardo Colon Santana
*Assistant Examiner* — Iftekhar Mustafa
(74) *Attorney, Agent, or Firm* — Lee Hong Degerman Kang & Waimey

(57) ABSTRACT

An apparatus for modifying voltage command for detecting output current in inverter is disclosed to modify a PWM voltage command by determining a sector in a voltage hexagon, the sector having a PWM voltage command therein, by comparing the PWM voltage command, determining an area, the area having the PWM voltage command, within a current detection disabled area by converting a minimum sampling time to a minimum sampling PWM and using the converted minimum sampling PWM, and determining an adjusting voltage and a restoring voltage using a minimum injection voltage based on the determined area.

13 Claims, 19 Drawing Sheets

(51) Int. Cl.
*H02M 7/5387* (2007.01)
*H02M 7/5395* (2006.01)
*H02M 1/00* (2006.01)

(52) U.S. Cl.
CPC ............... *H02M 7/53871* (2013.01); *H02M 2001/0009* (2013.01); *H02M 2007/53876* (2013.01)

(56) References Cited

U.S. PATENT DOCUMENTS

| | | | |
|---|---|---|---|
| 2005/0088136 A1* | 4/2005 | Kitajima | H02P 27/08 318/801 |
| 2009/0212733 A1 | 8/2009 | Hsieh et al. | |
| 2011/0057641 A1 | 3/2011 | Finke et al. | |

FOREIGN PATENT DOCUMENTS

| | | |
|---|---|---|
| CN | 100566112 | 12/2009 |
| CN | 102057281 | 5/2011 |
| EP | 1808955 | 7/2007 |
| FR | 2832871 | 5/2003 |
| JP | 2003-079159 | 3/2003 |
| JP | 2003-209976 | 7/2003 |
| JP | 2005-012934 | 1/2005 |
| JP | 2005-531270 | 10/2005 |
| JP | 2008-131770 | 6/2008 |

OTHER PUBLICATIONS

Cho, et al., "Voltage Injection Method for Boundary Expansion of Output Voltages in Three Shunt Sensing PWM Inverters," 8th International Conference on Power Electronics—ECCE Asia, May 2011, 5 pages.
Korean Intellectual Property Office Application Serial No. 10-2013-0076942, Office Action dated Sep. 18, 2014, 4 pages.
European Patent Office Application Serial No. 14173428.5, Search Report dated Feb. 24, 2015, 7 pages.
Japan Patent Office Application Serial No. 2014-136642, Office Action dated Jun. 24, 2015, 5 pages.
The State Intellectual Property Office of the People's Republic of China Application Serial No. 201410313208.9, Office Action dated Jun. 29, 2016, 6 pages.

* cited by examiner (a)            (b)

FIRST AREA　　　SECOND AREA　　　THIRD AREA

APPARATUS FOR MODIFYING VOLTAGE COMMAND FOR DETECTING OUTPUT CURRENT IN INVERTER

CROSS-REFERENCE TO RELATED APPLICATIONS

Pursuant to 35 U.S.C. §119 (a), this application claims the benefit of earlier filing date and right of priority to Korean Patent Application No. 10-2013-0076942, filed on Jul. 2, 2013, the contents of which are all hereby incorporated by reference in their entirety.

BACKGROUND OF THE INVENTION

Field of the Invention

The present disclosure relates to an apparatus for modifying voltage command for detecting output current in inverter.

Description of Related Art

In general, a 3-phase inverter serves to drive a 3-phase AC motor in variable frequency, and is variably used due to high power efficiency and enablement of instantaneous torque control. The 3-phase inverter is generally used for control or protection by detecting an output current. Recently, low-priced current detection methods are proposed for household electronics inverters and industrial inverters, and one of the methods is to use a shunt resistor. The output current detection in inverter using the shunt resistor is reasonable in price and low in inverter unit price over the conventional one using a current sensor using Hall effect.

A particular condition must be satisfied in an inverter switching pattern, in order to accurately detect an output current of inverter using the shunt resistor.

FIG. 1 is a circuit diagram illustrating detection of inverter output current using a shunt resistor.

Referring to FIG. 1, the principle of detection of inverter output current using a shunt resistor is such that a DC voltage of DC link capacitor (110) is converted to an AC voltage by a switching unit (120) to be applied to a motor (200), and when a lower switch of the switching unit (120) is turned on, an inverter output current flows to a shunt resistor (130), and an insulation or non-insulation calculation amplifier (140) measures a voltage of the shunt resistor (130) to detect a current.

A current must be sampled to detect the inverter output current, where an inverter voltage command must be modified when the inverter voltage command is in a current detection disabled area.

The switching unit (120) in the 3-phase inverter as in FIG. 1 generally synthesizes a variable size and an AC voltage of variable frequency using a PWM (Pulse Width Modulation) control. Now, a SVPWM (Space Vector PWM) control in the PWM control will be described.

FIG. 2 is an exemplary view illustrating an SVPWM method.

Referring to FIG. 2, a single phase switch includes, as in (a), an upper switch (120a) and a lower switch (120b), which may be equivalently expressed by a switch of (b). (c) and (d) define two switching states, where the state of (c) is defined by Sa=1, the state of (d) is defined by Sa=0.

An output voltage in one switching period includes an ON sequence voltage and an OFF sequence voltage. The ON sequence refers to a stage where a state of upper switch (120a) in one phase is changed from OFF to ON, and the OFF sequence refers to a stage where a state is changed from ON to OFF. When state of each phase is combined, a voltage vector corresponding to a vertex of a hexagon as in FIG. 3 may be generated.

FIG. 3 is an exemplary view illustrating a voltage vector.

Referring to FIG. 3, voltages inside the hexagon may be synthesized using a PWM control. In view of the fact that switching loss can be reduced by minimized state changes of switch, voltage vectors are generally synthesized by combining the switching states corresponding to three vertexes of a triangle including a voltage command.

At this time, a zero vector means a voltage vector where switches on all phases are turned on or off, whereby power is not transmitted due to there being no voltage difference among phases of a motor (200). Furthermore, an effective vector means a voltage vector positioned at a vertex of a hexagon, which is not a zero vector.

FIG. 4 is an exemplary view illustrating synthesis of terminal voltages (Van, Vbn, Vcn) according to PWM method using a triangular wave.

FIG. 4 shows that a switching state is changed from 000(zero vector)→100(effective vector)→110(effective vector)→111(zero vector)→110(effective vector)→100(effective vector)→000, where the switching frequency is minimized because a switch with only one phase is changed when each vector is applied.

FIG. 5 is an exemplary view explaining relationship between FIG. 3 and FIG. 4, where it can be noted that effective times of T1 and T2 may be illustrated in a voltage hexagon of FIG. 3. The voltage hexagon is the output voltage vectors corresponding to the switch states described by the hexagon.

FIG. 6 is an exemplary view illustrating an area where current detection is disabled, and FIG. 7 is an exemplary view illustrating a switching ripple generated from a shunt resistor. Shaded areas in (a) and (b) of FIG. 6 are areas where current detection is disabled.

As in (a), the reason of generating an area in a polygon where current detection is disabled is that, after a switch is turned off as in FIG. 7, a switching ripple is generated on a shunt resistor, and an accurate current can be detected by measurement of voltage only after the switching ripple disappears, which may be expressed by the following Equation 1.

$$T_b = T_0 + T_1 = 0.5(0.5T_{sw} - T_1 - T_2) + T_1 = 0.5(0.5T_{sw} + T_1 - T_2) < T_{min}$$

$$T_2 - T_1 > 0.5 T_{sw} - 2T_{min} \quad \text{[Equation 1]}$$

The Equation 1 is effective when an indirectly calculating method is used in which a sum of 3-phase current is zero where currents of two phases are read and a current of remaining one phase. A condition where a zero vector application time is greater than Tmin must be added in order to obtain a time of Tmin for all 3-phases.

When this condition is added, a current detectable area is reduced in the hexagon, as illustrated in FIG. 6(a). However, in case of a condition for obtaining a time of Tmin for only 2-phases, only three small areas become detection disabled areas as illustrated in FIG. 6(b), whereby a detectable area can be enlarged. Thus, it can be said that a method of reading currents on 2-phases is excellent.

FIG. 8 is an exemplary view illustrating a border between a detection disabled area and a detectable area, where a geometric nature is used in which two sides of an isosceles triangle are same. FIG. 9 is an exemplary view illustrating a time of current sampling, where it can be noted that a current can be sampled when switching states of all phases are zero.

The current detection in the shunt resistor is performed after OFF sequence shunt voltage, and therefore, a current detectable area can be expanded by moving the OFF sequence voltage to a current detectable area, and compensating as much as a difference from the ON sequence voltage, because a current detection on resistance is performed after the OFF sequence voltage.

Voltages are conventionally adjusted by dividing the current detection disabled area to three areas such as S1, S2 and S3.

FIG. 10 is schematic views illustrating a current detection disabled area that is divided into three areas.

That is, injection voltages (Vdss_inj, Vqss_inj) at each area (S1, S2, S3) are calculated, a sum (adjusted voltage) of original voltages and injection voltages is used as a voltage command at OFF sequence, a voltage (compensation voltage) in which an injection voltage is deducted from an original voltage is used as a voltage command at ON sequence, and an average of the ON sequence voltage and OFF sequence voltage is made to be equal to the original voltages (Vdss_org, Vqss_org).

In the conventional method, determination must be made in which area the original voltage command is included, where too many calculations are required to create a burden when a speed of CPU is slow.

Hereinafter, a process of calculating an injection voltage by determining conventional areas will be described.

FIG. 11 is an exemplary view illustrating a process of determining an injection voltage according to prior art.

Referring to FIG. 11, the conventional process of determining an injection voltage is such that a sector is determined (S111), and a voltage command is moved to a sector 1 (S112). The reason of calculation by moving the voltage command to the sector 1 is that other sectors and the sector 1 are on the same position when symmetrically or rotatably moved to allow using the same injection voltage equation.

S111 determines on which sector an original voltage command exists by using a linear Equation of Equation 2. When using a fixed point arithmetic, calculation of $\sqrt{3}$ may be expressed by the following Equation 3 to thereby require a division calculation. At this time, the number of $\sqrt{3}$ contained in two linear equations is 2, such that maximum 2 division calculations are required in S111.

$$y = \sqrt{3}\,x,\ y = -\sqrt{3}\,x \qquad \text{[Equation 2]}$$

$$\sqrt{3} = \frac{1732}{1000} \qquad \text{[Equation 3]}$$

S112 uses Equations 4 to 8. $\sqrt{3}$ is also contained in this step to require a division calculation. Sector 2 is moved to sector 1 in Equation 4, sector 3 is moved to sector 1 in Equation 5, sector 4 is moved to sector 1 in Equation 6, sector 5 is moved to sector 1 in Equation 7, and sector 6 is moved to sector 1 in Equation 8.

$$\begin{bmatrix} V'_{ds} \\ v'_{qs} \end{bmatrix} = \begin{bmatrix} -\frac{1}{2} & \frac{\sqrt{3}}{2} \\ \frac{\sqrt{3}}{2} & \frac{1}{2} \end{bmatrix} \begin{bmatrix} V'_{ds} \\ v'_{qs} \end{bmatrix} \qquad \text{[Equation 4]}$$

$$\begin{bmatrix} V'_{ds} \\ v'_{qs} \end{bmatrix} = \begin{bmatrix} -\frac{1}{2} & \frac{\sqrt{3}}{2} \\ -\frac{\sqrt{3}}{2} & -\frac{1}{2} \end{bmatrix} \begin{bmatrix} V'_{ds} \\ v'_{qs} \end{bmatrix} \qquad \text{[Equation 5]}$$

$$\begin{bmatrix} V'_{ds} \\ v'_{qs} \end{bmatrix} = \begin{bmatrix} -\frac{1}{2} & -\frac{\sqrt{3}}{2} \\ -\frac{\sqrt{3}}{2} & \frac{1}{2} \end{bmatrix} \begin{bmatrix} V'_{ds} \\ v'_{qs} \end{bmatrix} \qquad \text{[Equation 6]}$$

$$\begin{bmatrix} V'_{ds} \\ v'_{qs} \end{bmatrix} = \begin{bmatrix} -\frac{1}{2} & -\frac{\sqrt{3}}{2} \\ \frac{\sqrt{3}}{2} & \frac{1}{2} \end{bmatrix} \begin{bmatrix} V'_{ds} \\ v'_{qs} \end{bmatrix} \qquad \text{[Equation 7]}$$

$$\begin{bmatrix} V'_{ds} \\ v'_{qs} \end{bmatrix} = \begin{bmatrix} 1 & 0 \\ 0 & -1 \end{bmatrix} \begin{bmatrix} V'_{ds} \\ v'_{qs} \end{bmatrix} \qquad \text{[Equation 8]}$$

In FIG. 11, an area is determined after moving the voltage command to sector 1 to calculate an injection voltage (S113), and movement is made again to the original sector (S114).

S113 explains a linear equation for dividing the areas. A linear equation for dividing to an area 1 (S1) and a current detectable area may be expressed by the following Equation 9.

$$y = \frac{1}{\sqrt{3}}x + \frac{2}{3}\left(1 - \frac{4T_{min}}{T_{sw}}\right)\frac{1}{\sqrt{3}} V_{dc} \qquad \text{[Equation 9]}$$

A line dividing the area 1 (S1) and area 2 (S2) is a straight line FG in FIG. 10, where a point F is a point that internally divides J and D to a ratio of 1:2, and a point G is a point that internally divides A and C to a ratio of 2:3. Obtainment, using the above, of an equation for line FB and an equation for line AC may be expressed by the following Equations 10 and 11.

$$y = \frac{\sqrt{3}}{7}x + \frac{2}{7}\left(3 - \frac{4T_{min}}{T_{sw}}\right)\frac{1}{\sqrt{3}} V_{dc} \qquad \text{[Equation 10]}$$

$$y = \frac{1}{\sqrt{3}}x + \frac{4}{3}\left(1 - \frac{T_{min}}{T_{sw}}\right)\frac{1}{\sqrt{3}} V_{dc} \qquad \text{[Equation 11]}$$

Areas may be determined by using the linear equations, and after the determination, an injection voltage of a relevant area may be determined by the following Equation 12.

[Equation 12]

$$V_{dss\_inj} = -\frac{1}{4}V^{ref}_{dss\_org} + \frac{\sqrt{3}}{4}V^{ref}_{qss\_org} - \frac{V_{dc}}{6}\left(1 - \frac{4T_{min}}{T_{sw}}\right), \quad \text{S1}$$

$$V_{qss\_inj} = \frac{\sqrt{3}}{4}V^{ref}_{dss\_org} - \frac{3}{4}V^{ref}_{qss\_org} + \frac{\sqrt{3}V_{dc}}{6}\left(1 - \frac{4T_{min}}{T_{sw}}\right), \quad \text{S1}$$

$$V_{dss\_inj} = -\frac{1}{2}V^{ref}_{dss\_org} + \frac{\sqrt{3}}{2}V^{ref}_{qss\_org} + \frac{V_{dc}}{3}\left(-1 + \frac{4T_{min}}{T_{sw}}\right), \quad \text{S2}$$

$$V_{qss\_inj} = \frac{1}{2\sqrt{3}}V^{ref}_{dss\_org} - \frac{1}{2}V^{ref}_{qss\_org} - \frac{V_{dc}}{3\sqrt{3}}\left(-1 + \frac{4T_{min}}{T_{sw}}\right), \quad \text{S2}$$

$$V_{dss\_inj} = -V^{ref}_{dss\_org} + \frac{V_{dc}}{3}\left(1 + \frac{2T_{min}}{T_{sw}}\right), \quad \text{S3}$$

$$V_{qss\_inj} = -V_{qss\_org}^{ref} + \frac{V_{dc}}{\sqrt{3}}\left(1 - \frac{2T_{min}}{T_{sw}}\right), \quad S3$$

As noted above, determination of injection voltage may also require the division calculation. The injection voltage is determined at S113, and then the determined voltage is to be converted to an original vector, where the division calculation is required again. Because a voltage in which an original voltage command and the injection voltage are added is dq voltage, the voltage (an original voltage command and the injection voltage are added) is converted to ABC phase voltages, and to PWM command using SVPWM control.

The division calculation at fixed point arithmetic is processed by using several instruction words, and TMS319F2809 (operation clock: 60 MHz) of TI company requires 0.05 µs, for example. The frequency of division for each step according to prior art may be expressed by the following table.

TABLE 1

| Calculation process | Frequency of division |
| --- | --- |
| Sector determination | 4 |
| Area determination | 11 |
| Injection voltage calculation | 5 |
| adjusting/restoring voltage calculation | 4 |

As noted above, the conventional current detection method suffers a disadvantage that requires lots of calculations.

SUMMARY OF THE INVENTION

The present disclosure is to provide an apparatus for modifying voltage command for detecting output current in inverter configured to calculate a desired voltage within a fast period of time, with fewer number of calculations and free from division calculation, and to minimize the size of voltage that is injected.

In one general aspect of the present disclosure, there is provided an apparatus for modifying voltage command for detecting output current in inverter, the apparatus comprising:
a first determiner configured to determine a sector in a voltage hexagon, the sector having a PWM voltage command therein, by comparing the PWM voltage command;
a second determiner configured to determine an area, the area having the PWM voltage command, within a current detection disabled area by converting a minimum sampling time to a minimum sampling PWM and using the converted minimum sampling PWM; and
a command modification unit configured to determine an adjusting voltage and a restoring voltage using a minimum injection voltage based on the determined area and to modify the PWM voltage command, wherein the adjusting voltage is a voltage that has moved to a current detectable area, and the restoring voltage is a voltage that has compensated a difference of the adjusting voltage.

Preferably, but not necessarily, the first determiner may determine a maximum voltage, an intermediate voltage and a minimum voltage at a 3-phase PWM voltage command using the determination of the sector.

Preferably, but not necessarily, the second determiner may not modify the PWM voltage command by determining that the area positioned with the PWM voltage command is a current detectable area, when a voltage deducted of a minimum sampling PWM from a maximum value of PWM triangular wave is greater than or equal to the intermediate voltage.

Preferably, but not necessarily, the second determiner may determine the area having the PWM voltage command as a first area when the restoring voltage is smaller than or equal to a maximum voltage.

Preferably, but not necessarily, the first area may be defined by an area where a zero vector application time of the adjusting voltage and the restoring voltage is unchanged.

Preferably, but not necessarily, the command modification unit may determine the adjusting voltage and the restoring voltage by applying each application time of voltage vector to the PWM voltage command by calculating said each application time of voltage vector using geometric nature of the voltage hexagon.

Preferably, but not necessarily, the second determiner may determine the area having the PWM voltage command as a second area when a zero vector application time of restoring voltage is greater than zero.

Preferably, but not necessarily, the second area may be defined by an area where a zero vector application time of the restoring voltage grows smaller than a zero vector application time of PWM voltage command.

Preferably, but not necessarily, the command modification unit may determine the adjusting voltage and the restoring voltage by applying each application time of voltage vector to the PWM voltage command by calculating said each application time of voltage vector using geometric nature of the voltage hexagon.

Preferably, but not necessarily, the second determiner may determine as a third area when a difference between the intermediate voltage and the minimum voltage is smaller than a difference between the twice the maximum value of the PWM triangular wave and the minimum value divided by 2.

Preferably, but not necessarily, the third area may be defined by an area where a zero vector application time of the adjusting voltage also changes.

Preferably, but not necessarily, the command modification unit may determine an injection voltage to allow the minimum voltage to be injected in an area that satisfies a first condition where the PWM voltage command deviates from the current unmeasureable area by the injection voltage, and a second condition where a compensation voltage must exist within a voltage hexagon, and determines the adjusting voltage and the restoring voltage using said determination.

Preferably, but not necessarily, the second determiner may determine as a fourth area when a difference between the intermediate voltage and the minimum voltage is greater than or equal to a difference between the twice the maximum value of the PWM triangular wave and the minimum value divided by 2.

Preferably, but not necessarily, the command modification unit may determine the adjusting voltage and the restoring voltage within the current measurable area in consideration of an amount of voltage error.

Preferably, but not necessarily, the PWM voltage command may be generated by an inverter controller, wherein the inverter controller includes a converter configured to convert a 2-phase voltage command outputted from a 3-phase inverter to a 3-phase voltage command, an application unit configured to convert the 3-phase voltage command to a terminal voltage command using a space vector, a generator configured to generate a PWM voltage command using the terminal voltage command, and a modifier configured to modify the PWM voltage command when the PWM voltage command is positioned at the current detection disabled area within the voltage hexagon.

Advantageous Effects

The apparatus for modifying voltage command for detecting output current in inverter according to the present disclosure has an advantageous effect in that a calculation time is reduced due to reduced amount of calculation and a predetermined calculation timed is consumed regardless of sectors.

Another advantageous effect is that a size of injection voltage at a third area can be minimized and a current sampling-interrupted section becomes obsolete due to addition of a fourth area.

DETAILED DESCRIPTION OF THE INVENTION

The following detailed description of the embodiments of the present disclosure is not intended to limit the scope of the disclosure, as claimed, but is merely representative of possible embodiments of the disclosure. Consequently, the embodiments described herein are further intended to explain modes known of practicing the invention and to enable others skilled in the art to utilize the invention in such, or other embodiments and with various modifications required by the particular application(s) or use(s) of the present disclosure.

Hereinafter, the present disclosure will be described in detail with reference to the accompanying drawings.

Figure 12:
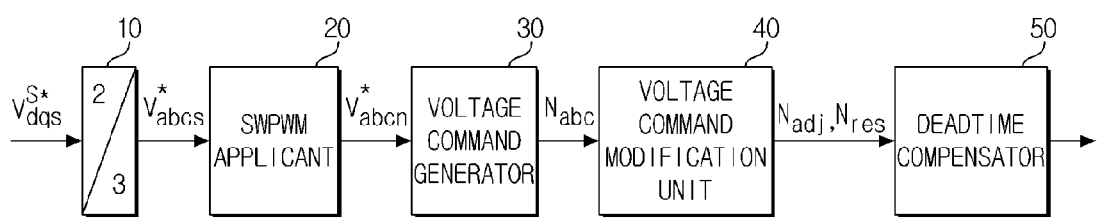
FIG. 12 is a block diagram illustrating an inverter controller applied with a voltage command modification unit according to an exemplary embodiment of the present disclosure.

FIG. 12 is a block diagram illustrating an inverter controller applied with a voltage command modification unit according to an exemplary embodiment of the present disclosure.

Referring to FIG. 12, the inverter controller according to the present disclosure includes a converter (10), an SVPWM application unit (20), a voltage command generator (30), and a voltage command modification unit (40). The inverter controller may further include a dead time compensator (50).

The converter (10) serves to convert a 2-phase dg voltage command of output voltage of a 3-phase inverter to a 3-phase voltage command, and uses the following Equation.

$$V_{as} = V_{ds} \qquad \text{[Equation 13]}$$
$$V_{bs} = -\frac{1}{2}V_{ds} + \frac{\sqrt{3}}{2}V_{qs}$$
$$V_{cs} = -\frac{1}{2}V_{ds} - \frac{\sqrt{3}}{2}V_{qs}$$

The SVPWM application unit (20) converts the 3-phase voltage converted by the converter (10) to a terminal voltage command using SWPWM. At this time, the SVPWM application unit (20) uses the following equation.

$$V_{an} = V_{as} + V_{sn} \qquad \text{[Equation 14]}$$
$$V_{bn} = V_{bs} + V_{sn}$$
$$V_{cn} = V_{cs} + V_{sn}$$
$$V_{sn} = -\frac{V_{max} + V_{min}}{2}$$

-continued $$V_{max} = \max(V_{as}, V_{bs}, V_{cs}),$$

$$V_{min} = \min(V_{as}, V_{bs}, V_{cs})$$

where, Vsn is an offset voltage, and is calculated by attaching a negative symbol after averaging a maximum value and a minimum value of phase voltage.

The command voltage generator (30) generates a PWM voltage command from the terminal voltage calculated by the SWPWM application unit (20) using the following Equation 15. At this time, Npeak is a maximum value of triangular wave (carrier), where the triangular wave has a scope from − Npeak to Npeak.

$$N_a = \frac{V_{an}}{\frac{V_{dc}}{2}} N_{peak}$$

$$N_b = \frac{V_{bn}}{\frac{V_{dc}}{2}} N_{peak}$$

$$N_c = \frac{V_{cn}}{\frac{V_{dc}}{2}} N_{peak}$$

[Equation 15]

Figure 1:
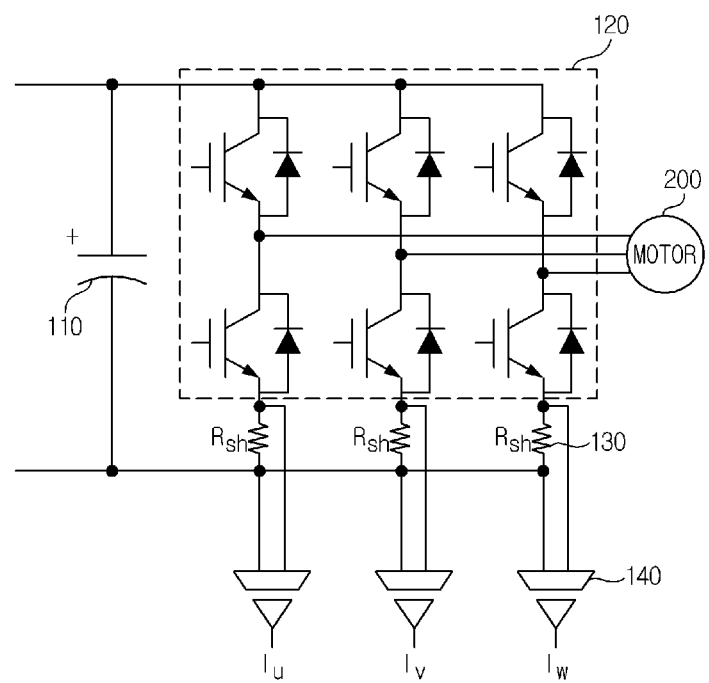
FIG. 1 is a circuit diagram illustrating detection of inverter output current using a shunt resistor.
Figure 2:
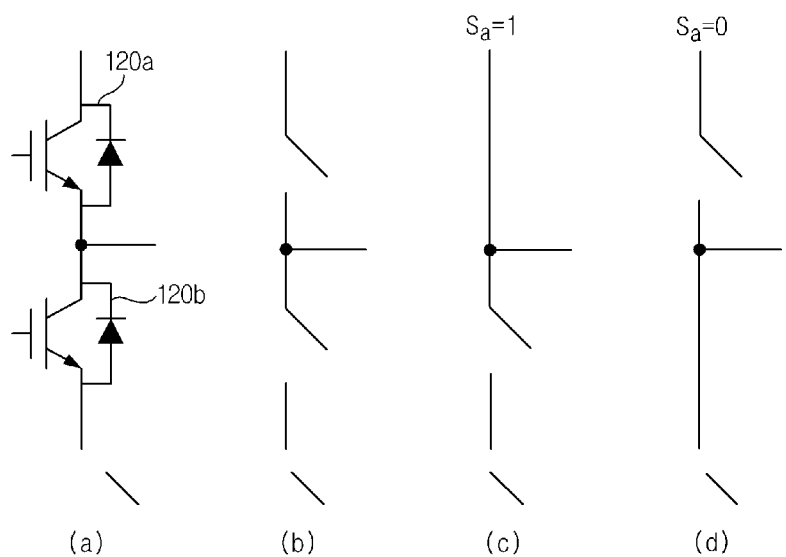
FIG. 2 is an exemplary view illustrating an SVPWM method.
Figure 3:
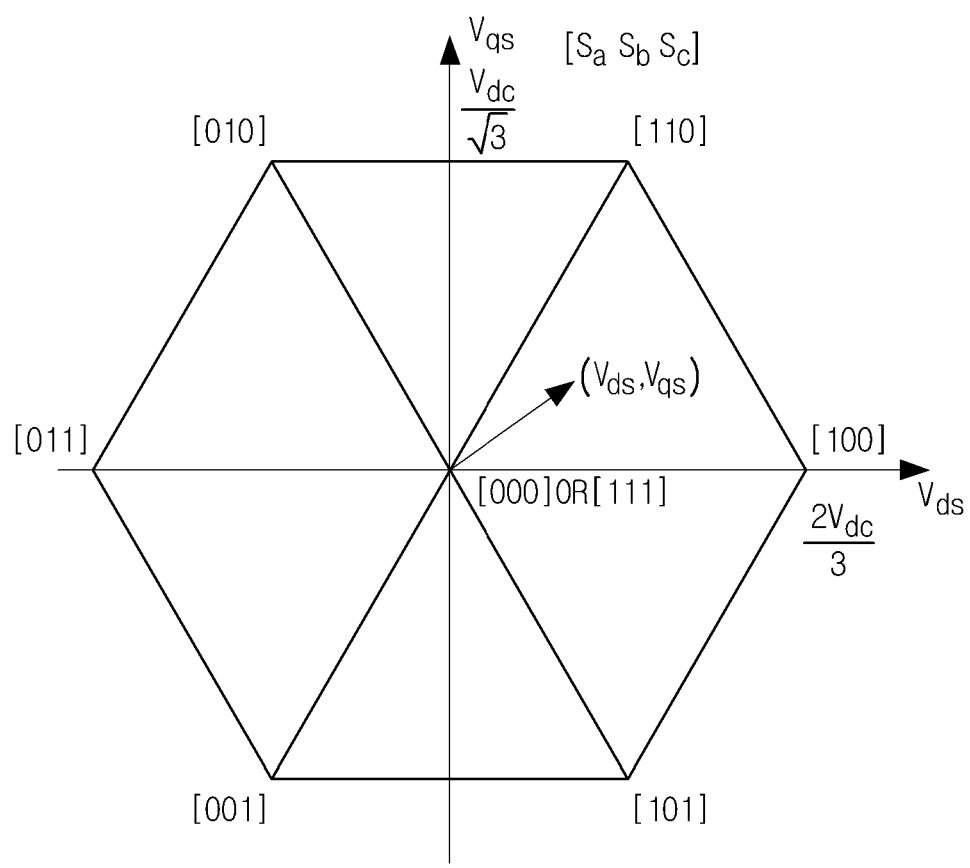
FIG. 3 is an exemplary view illustrating a voltage vector.
Figure 4:
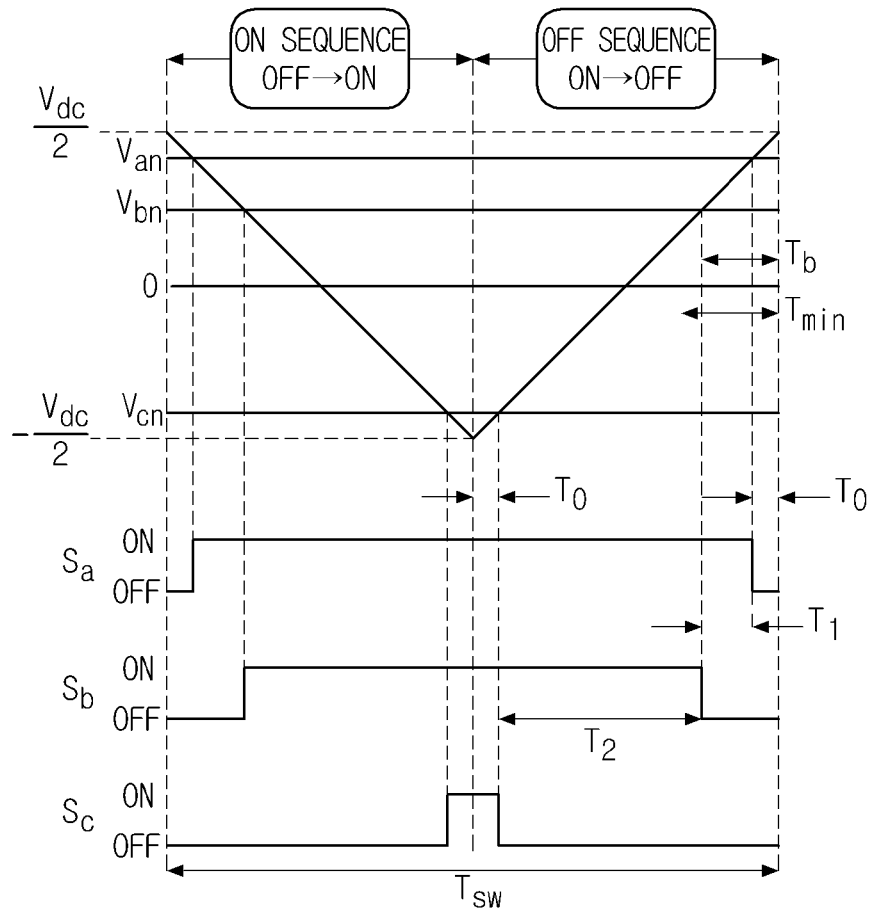
FIG. 4 is an exemplary view illustrating synthesis of terminal voltages (Van, Vbn, Vcn) according to PWM method using a triangular wave.
Figure 5:
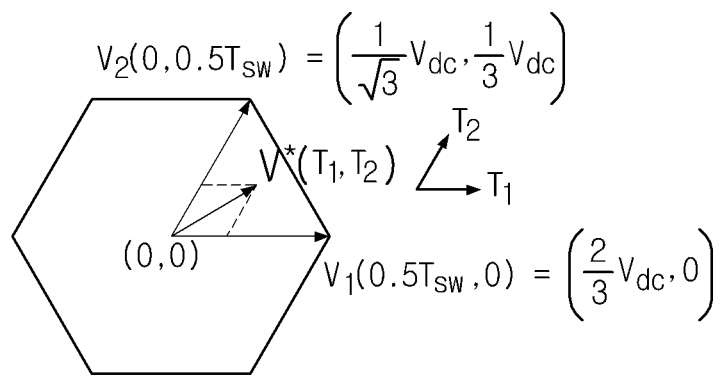
FIG. 5 is an exemplary view illustrating a relationship between FIG. 3 and FIG. 4.

At this time, a switching point of the switching unit (120) of inverter in FIG. 1 according to the voltage command calculated by the voltage command generator (30), where the voltage command modification unit (40) modifies the voltage command generated by the voltage command generator (30), when the voltage command is positioned at a current detection disabled area within a voltage hexagon, the detailed explanation of which will be made later.

The dead time compensator (50) adjusts a voltage command in order to reduce an error of output voltage generated by determination of output voltage according to size and polarity of current, when an upper switch and a lower switch (120a, 120b) of one phase are all in OFF state.

Now, an exemplary embodiment of the present disclosure will be described in detail with reference to the accompanying drawings.

Figure 13:
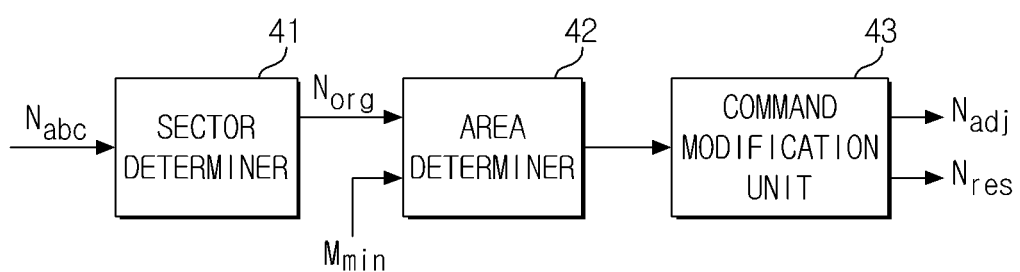
FIG. 13 is a detailed block diagram illustrating a voltage command modification unit of FIG. 12.

FIG. 13 is a detailed block diagram illustrating a voltage command modification unit (40) of FIG. 12.

Referring to FIG. 13, the voltage command modification unit (40) includes a sector determiner (41), an area determiner (42) and a command modification unit (43).

The sector determiner (41) receives the PWM voltage command generated by the voltage command generator (30) and compares the voltage command to determine the sector. When the SVPWM application unit (20) changes the phase voltage to terminal voltage, same sizes of offset voltages are added to 3 phases, such that there is no change in sizes. Furthermore, the PWM voltage command is a value multiplied by a predetermined value to the terminal voltage, such that there is no influence on sizes.

Figure 14:
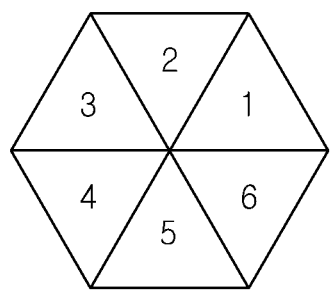
FIG. 14 is an exemplary view explaining definition of sector.

FIG. 14 is an exemplary view explaining definition of sector.

Referring to FIG. 14, a sector is divided into six, as explained in the background of the present disclosure, and may be defined by the Equation 14. Thus, the sector determiner (41) may determine the sectors by comparing PWM voltage commands as in the following table.

TABLE 2

| Sizes | sectors | Nmax | Nmid | Nmin |
|---|---|---|---|---|
| Na > Nb > Nc | 1 | Na | Nb | Nc |
| Nb > Na > Nc | 2 | Nb | Na | Nc |
| Nb > Nc > Na | 3 | Nb | Nc | Na |
| Nc > Nb > Na | 4 | Nc | Nb | Na |
| Nc > Na > Nb | 5 | Nc | Na | Nb |
| Na > Nc > Nb | 6 | Na | Nc | Nb |

Figure 7:
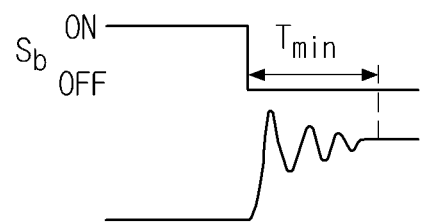
FIG. 7 is an exemplary view illustrating a switching ripple generated from a shunt resistor.
Figure 8:
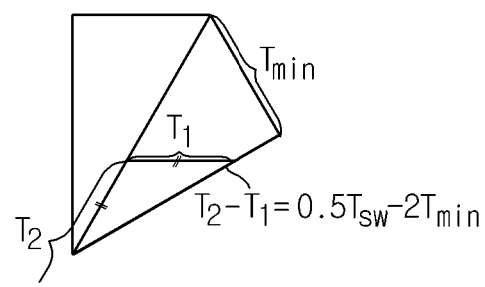
FIG. 8 is an exemplary view illustrating a border between an undetectable area and a detectable area.
Figure 9:
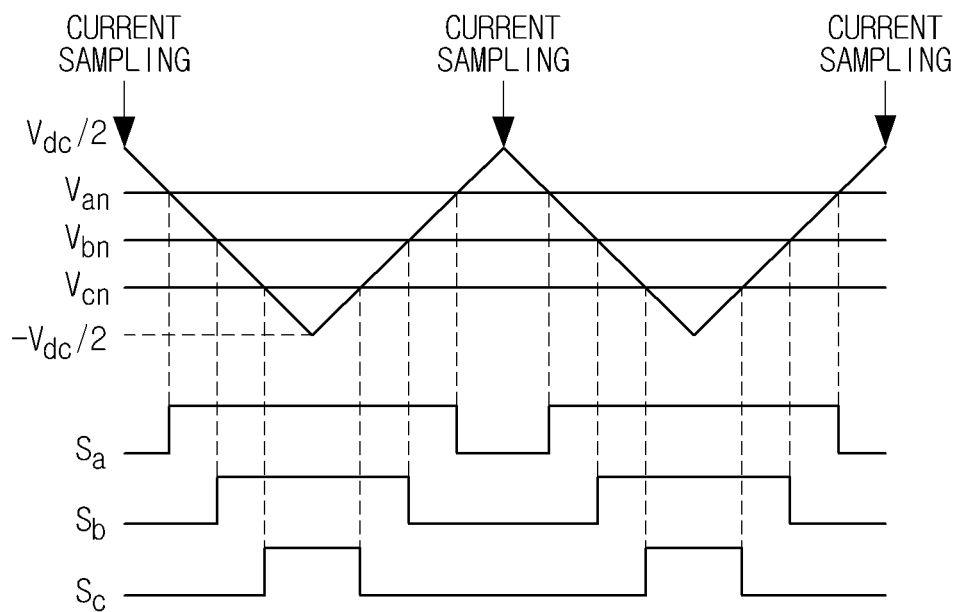
FIG. 9 is an exemplary view illustrating a current sampling point.

The area determiner (42) converts a minimum sampling time (Tmin) as explained in FIG. 7 to a minimum sampling PWM, and determines the area using the conversion. The area determination will be explained later.

Figure 15:
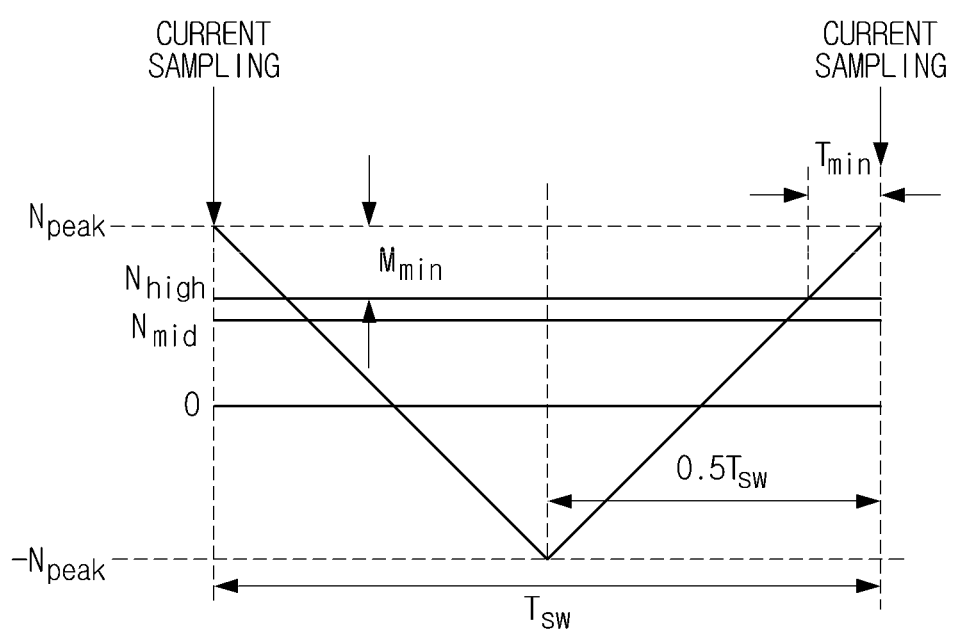
FIG. 15 is an exemplary view illustrating a relationship between a minimum sampling time and a minimum sampling PWM.

FIG. 15 is an exemplary view illustrating a relationship between a minimum sampling time and a minimum sampling PWM, where the minimum sampling time and the minimum sampling PWM may be defined by the following Equation 16. At this time, Nhigh may be defined by the following Equation 17.

$$M_{min} = \frac{T_{min}}{\frac{T_{sw}}{2}} 2 N_{peak}$$

[Equation 16]

$$N_{high} = N_{peak} - M_{min}$$

[Equation 17]

Furthermore, the command modification unit (43) determines an adjusting PWM voltage command and a restoring PWM voltage command based on the determined area to modify an original PWM voltage command. Voltage command before modification, the adjusting voltage command and the restoring voltage command may be defined by vectors of the following FIG. 18.

$$N_{org} = (N_{max}, N_{mid}, N_{min})$$

$$N_{adj} = (N_{max\_adj}, N_{mid\_adj}, N_{max\_adj})$$

$$N_{res} = (N_{max\_res}, N_{mid\_res}, N_{min\_res})$$

[Equation 18]

Figure 16:
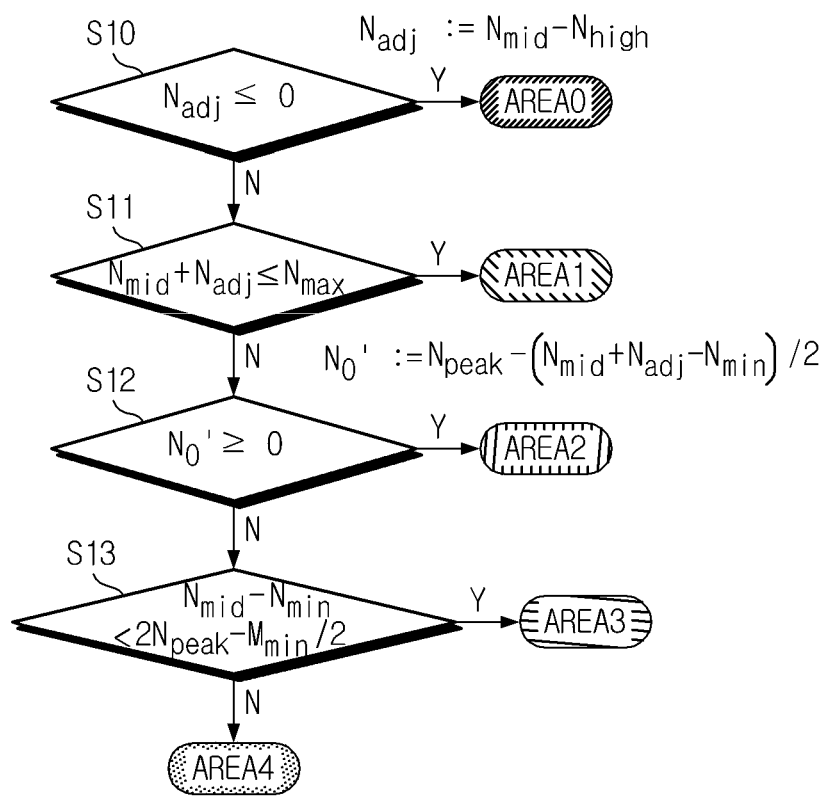
FIG. 16 is a flowchart illustrating a method of determining an area by an area determiner of FIG. 13.
Figure 17:
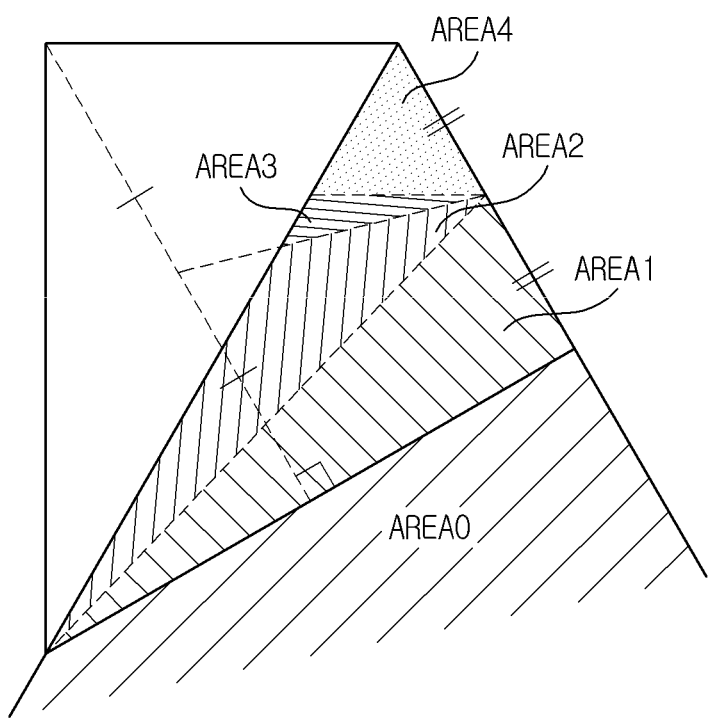
FIG. 17 is an exemplary view explaining an area defined by the present disclosure.

FIG. 16 is a flowchart illustrating a method of determining an area by an area determiner of FIG. 13, and FIG. 17 is an exemplary view explaining an area defined by the present disclosure.

Figure 6:
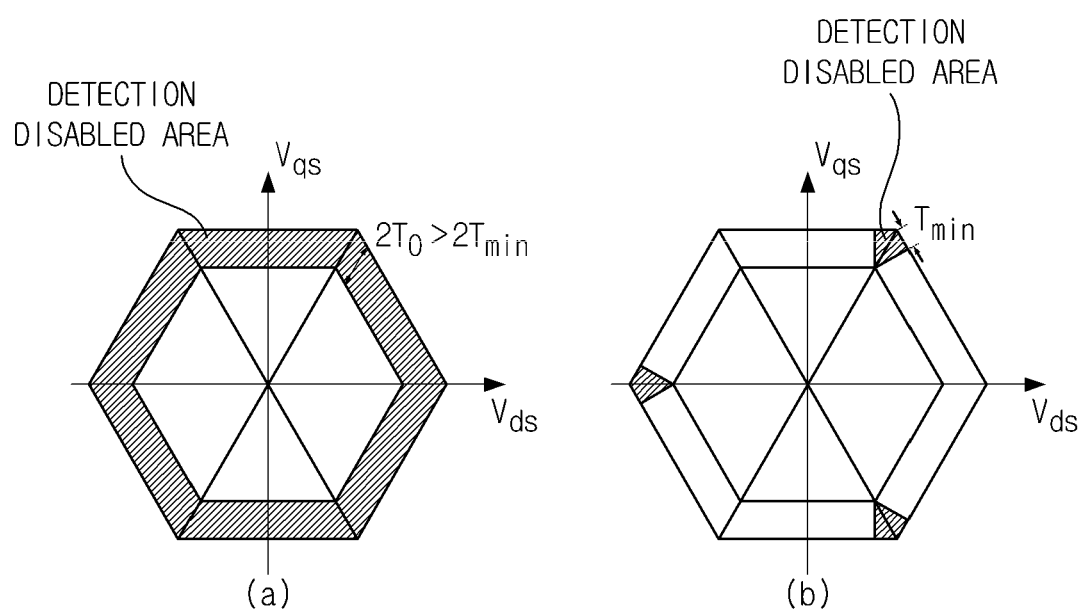
FIG. 6 is an exemplary view illustrating a current undetectable area.

FIG. 17 is a view in which the current detection disabled area (first area, second area, third area, fourth area) of FIG. 6 (b) and a current detectable area (zero area) are enlarged.

Figure 18:
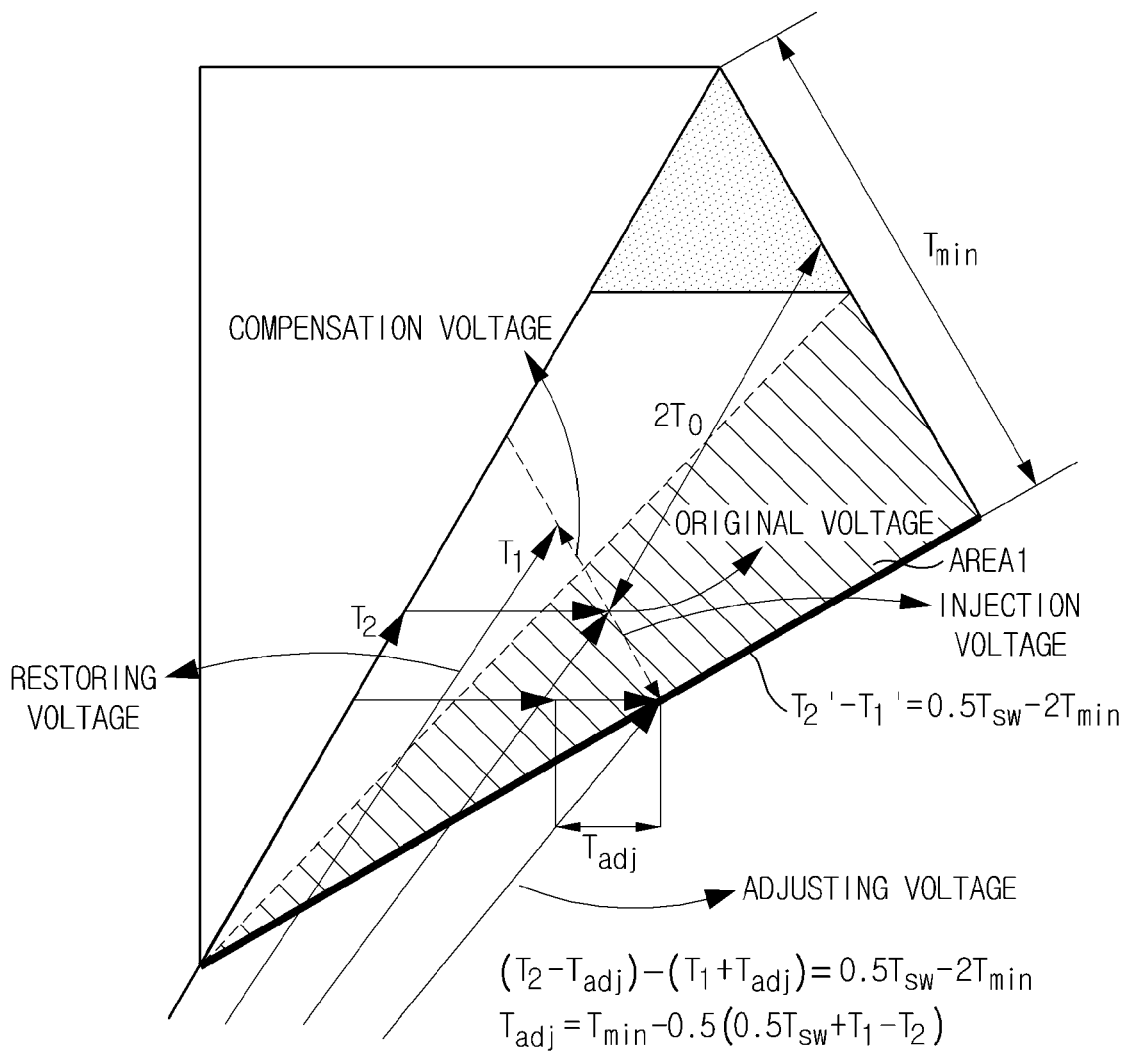
FIG. 18 is an exemplary view illustrating a first area of FIG. 17.

At this time, Nadj used for area determination is different from the vector of FIG. 18, and is a value in which Nmid is deducted by Nhigh. Detailed explanation related to the areas will be described later with reference to the accompanying drawings.

The area determiner (42) determines that a relevant voltage command is the zero area, when a value in which the zero areaNmid is deducted by Nhigh (Equation 17) is smaller than or equal to zero (0) (S10). The zero area is an area where the current detection is possible, and requires no modification relative to the voltage command.

The area determiner (42) determines that a relevant voltage command is the first area, when Nmid+Nadj is smaller than or equal to Nmax (S11). At this time, Nadj is Nmid−Nhigh. That is, Nmid−Nadj is an adjusting voltage and Nmid+Nadj is a restoring voltage, such that the area determiner (42) determines that the relevant voltage command is the first area, when sector is maintained due to the restoring voltage being smaller than the maximum command.

The area determiner (42) determines that a relevant voltage command is the second area, when zero vector application time of the restoring voltage is greater than zero (S12), where the zero vector application time of the restoring voltage may be defined by the following Equation 19.

$$N'_0 = N_{peak} - \frac{N_{mid} + N_{adj} - N_{min}}{2} \quad \text{[Equation 19]}$$

Furthermore, the area determiner (42) determines that a relevant voltage command is the third area, when the following equation is satisfied, and the area determiner (42) determines that a relevant voltage command is the fourth area (current detection disabled area), when a relevant voltage command is not the third area (S13).

$$N_{mid} - N_{min} < 2N_{peak} - \frac{M_{min}}{2} \quad \text{[Equation 20]}$$

When the area determiner (42) determines the areas as noted above, the command modification unit (43) may modify the adjusting PWM voltage command and the restoring PWM voltage command as in the following tables 3 and 4. However, in case of a relevant voltage command belonging to the zero area, command modification is not required as explained above.

TABLE 3

| $N_{adj}$ | FIRST AND SECOND AREAS | THIRD AREA | FOURTH AREA |
|---|---|---|---|
| $N_{max\_adj}$ | $N_{max}$ | $2(N_{mid} - N_{min}) + M_{min} - 3N_{peak}$ | $N_{peak}$ |
| $N_{mid\_adj}$ | $N_{high}$ | $N_{high}$ | $N_{high}$ |
| $N_{min\_adj}$ | $N_{min}$ | $-2(N_{mid} - N_{min}) - M_{min} + 3N_{peak}$ | $-N_{peak}$ |

TABLE 4

| $N_{res}$ | FIRST AREA | SECOND AREA |
|---|---|---|
| $N_{max\_res}$ | $N_{max}$ | $\frac{1}{2}N_{high} + \frac{3}{2}N_{max} - N_{mid}$ |
| $N_{mid\_res}$ | $2N_{mid} - N_{peak} - 4N_{mid}$ | $-\frac{1}{2}N_{high} + N_{mid} + \frac{1}{2}N_{max}$ |
| $N_{min\_res}$ | $N_{min}$ | $-\frac{1}{2}N_{high} - \frac{3}{2}N_{max} + N_{mid}$ |

| $N_{res}$ | THIRD AREA | FOURTH AREA |
|---|---|---|
| $N_{max\_res}$ | $5N_{peak} - 2M_{min} - 4N_{mid}$ | $3N_{max} - M_{mid} - N_{peak} - \frac{M_{min}}{2}$ |
| $N_{mid\_res}$ | $N_{peak}$ | $N_{peak}$ |
| $N_{min\_res}$ | $-N_{peak}$ | $-N_{peak}$ |

As noted above, the division calculation only include no other divisions but division by 2, and therefore, as the division calculation by 2 is to use a shift computation, the division calculation is actually non-existent.

Hereinafter, an area defined by the present disclosure and process of obtaining an adjusting voltage and a restoring voltage in the area will be described. The present disclosure describes that the area is divided into three as in the prior art to modify the voltage command, but the area may be differently defined in the present disclosure.

FIG. 18 is an exemplary view illustrating a first area of FIG. 17, where the first area is defined by an area where a zero vector application time (T0) of adjusting voltage and restoring voltage is unchanged.

In comparison with the prior art, an injection voltage is same but when the size of injection voltage is calculated, dq axis voltage is not calculated, and the geometric nature as in FIG. 18 is used to directly calculate an application time of each voltage vector for direct application to the voltage command of each phase, whereby an amount of calculation can be reduced.

Various voltage vectors used in the following description will be defined as in FIG. 18. An original voltage is an original voltage command prior to modification that is generated by the voltage command generator (30) of FIG. 12, and an injection voltage vector is a voltage vector deducted of an original voltage from a voltage at the OFF sequence that is moved to a current detectable area to enable a current detection.

A compensation voltage vector is a voltage vector deducted of an original voltage from a voltage at the ON sequence, where size is same that of injection voltage vector but direction is mutually opposite. An adjusting voltage vector is a vector where an original voltage vector and an injection voltage vector are added, and a restoring voltage vector is a vector where an average of the adjusting voltage vector and the restoring voltage vector equals to the original voltage vector, and a vector where an original voltage and a compensation voltage are added.

Figure 19:
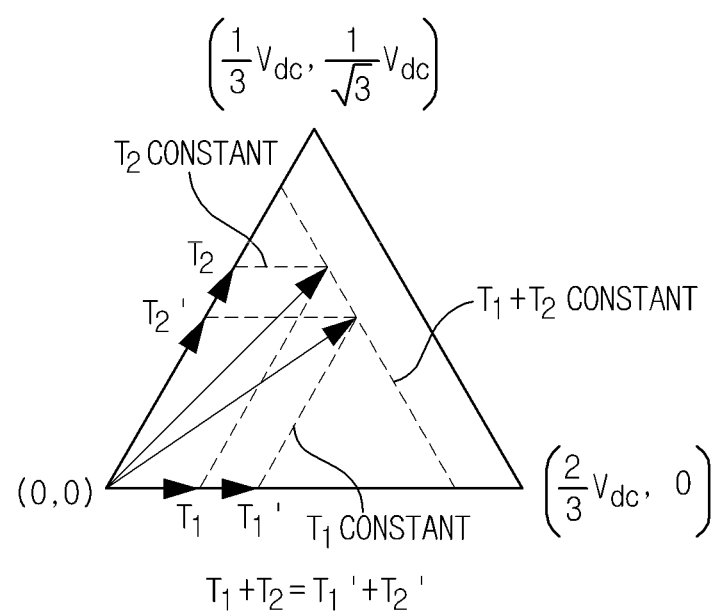
FIG. 19 is an exemplary view illustrating movement of voltage vector where zero vector application times become same.

FIG. 19 is an exemplary view illustrating movement of voltage vector where zero vector application times become same.

As explained above, the zero vector application time is a time where a time (T1+T2) applied by an effective vector is deducted from an entire switching period As illustrated in FIG. 19, when the voltage vector moves on a segment parallel to a segment connecting $$\left(\frac{1}{3}V_{dc}, \frac{1}{\sqrt{3}}V_{dc}\right) \text{ and } \left(\frac{2}{3}V_{dc}, 0\right),$$

it can be noted that T1+T2 are constant. The voltage compensation at the first area uses the geometric nature thus mentioned.

Figure 20:
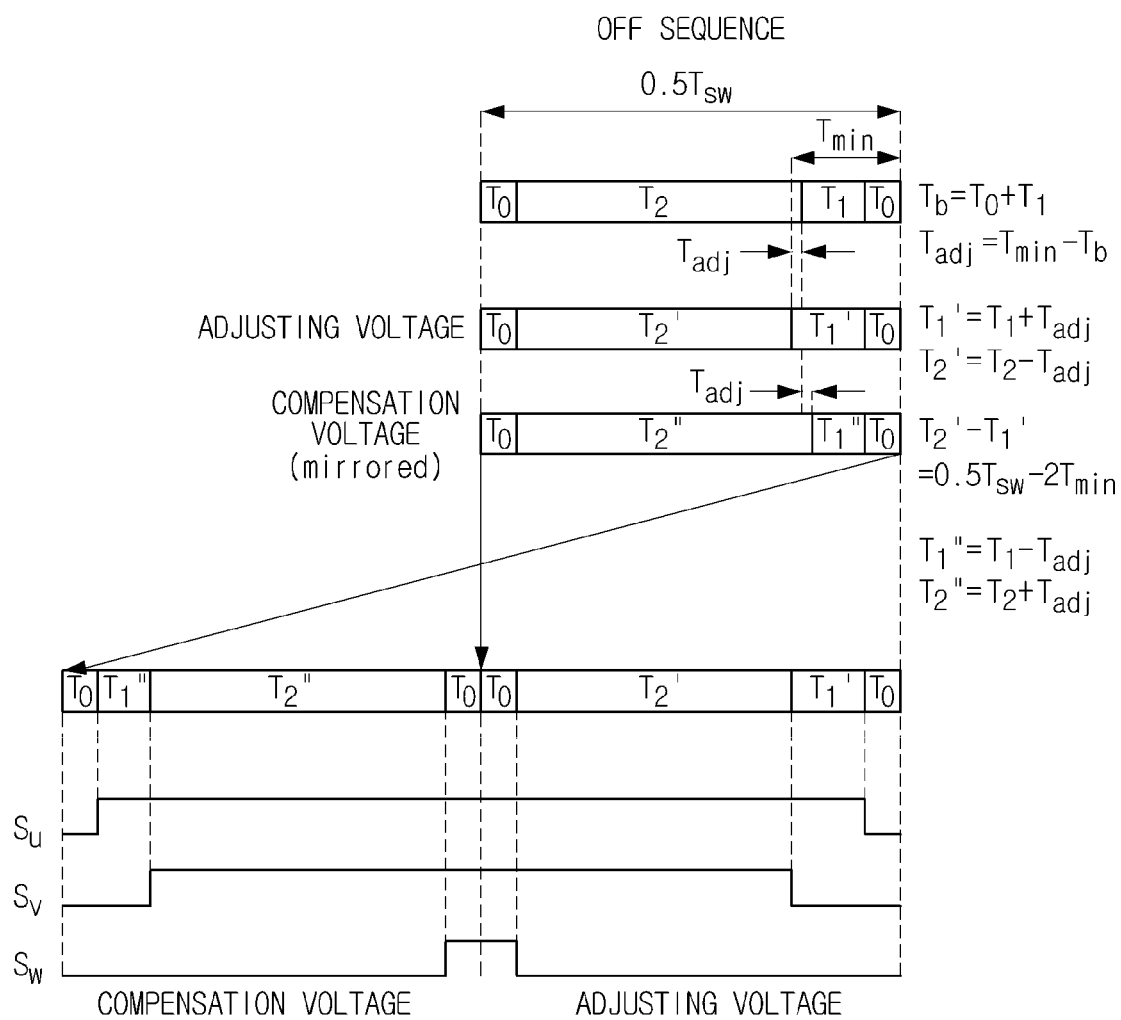
FIG. 20 is a schematic view illustrating a change at a switching point by modification of voltage command viewed from a first area.

FIG. 20 is a schematic view illustrating a change at a switching point by modification of voltage command viewed from a first area.

When a time (Tb) from a switching point of the intermediate voltage to an end point of OFF sequence is smaller than a current detection guarantee time (Tmin), and in order to obtain the time, an adjusting time (Tadj) is used to change the switching point, where it can be noted that a command of maximum voltage and a command of minimum voltage are unchanged, and only the intermediate voltage is changed. Even if the adjusting time is used to change the switching voltage of intermediate voltage, an effective vector application time at ON sequence and that on OFF sequence are identical.

Figure 21:
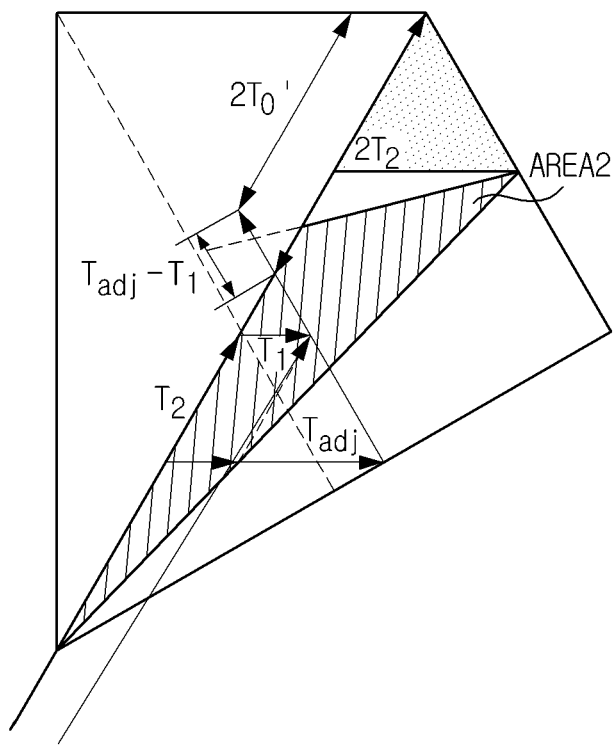
FIG. 21 is an exemplary view illustrating a second area of FIG. 17.

FIG. 21 is an exemplary view illustrating a second area of FIG. 17, where the second area is an area where a zero vector application time of the restoring voltage decreases.

Figure 22:
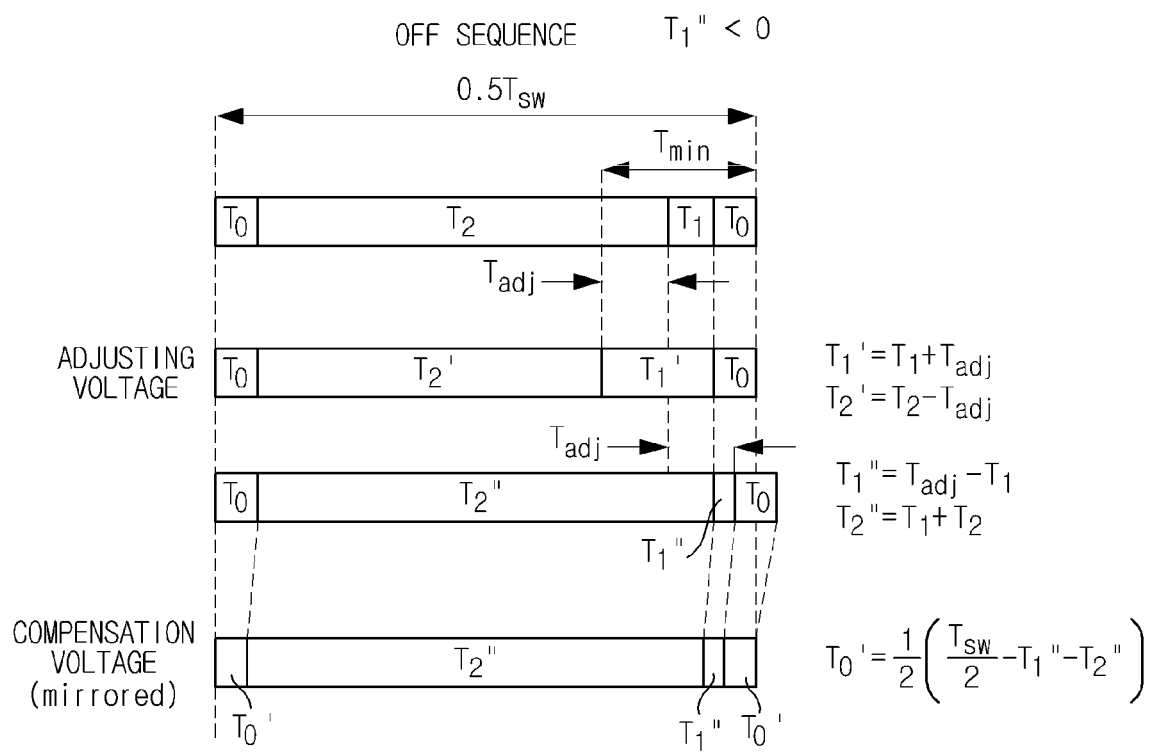
FIG. 22 is an exemplary view illustrating a change at a switching point by modification of voltage command viewed from a second area.

FIG. 22 is an exemplary view illustrating a change at a switching point by modification of voltage command viewed from a second area, where the intermediate voltage is changed at the adjusting voltage, and the zero vector application time decreases at the restoring voltage, whereby the switching points at maximum voltage and the minimum voltage are also changed. The relationship of T1+T2=T1'T2' applies at the first and second areas, and the compensation voltage exists at the second sector.

Figure 10:
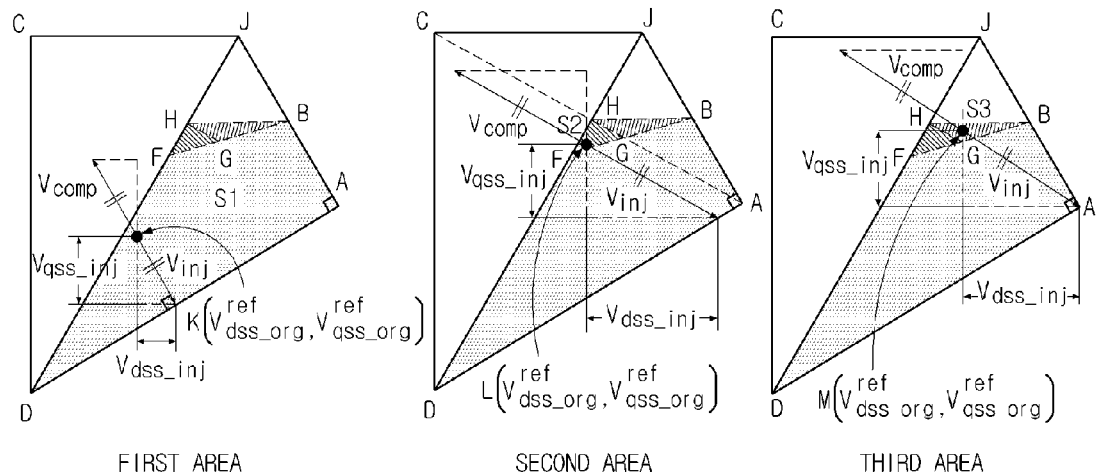
FIG. 10 is an exemplary view illustrating that a current undetectable area is divided into three areas.
Figure 11:
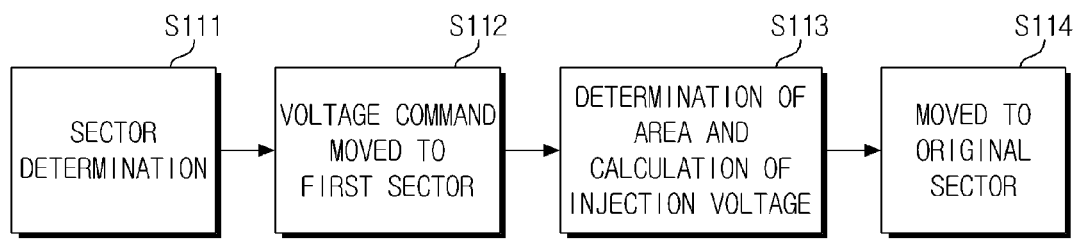
FIG. 11 is an exemplary view illustrating a process of determining an injection voltage according to prior art.
Figure 23:
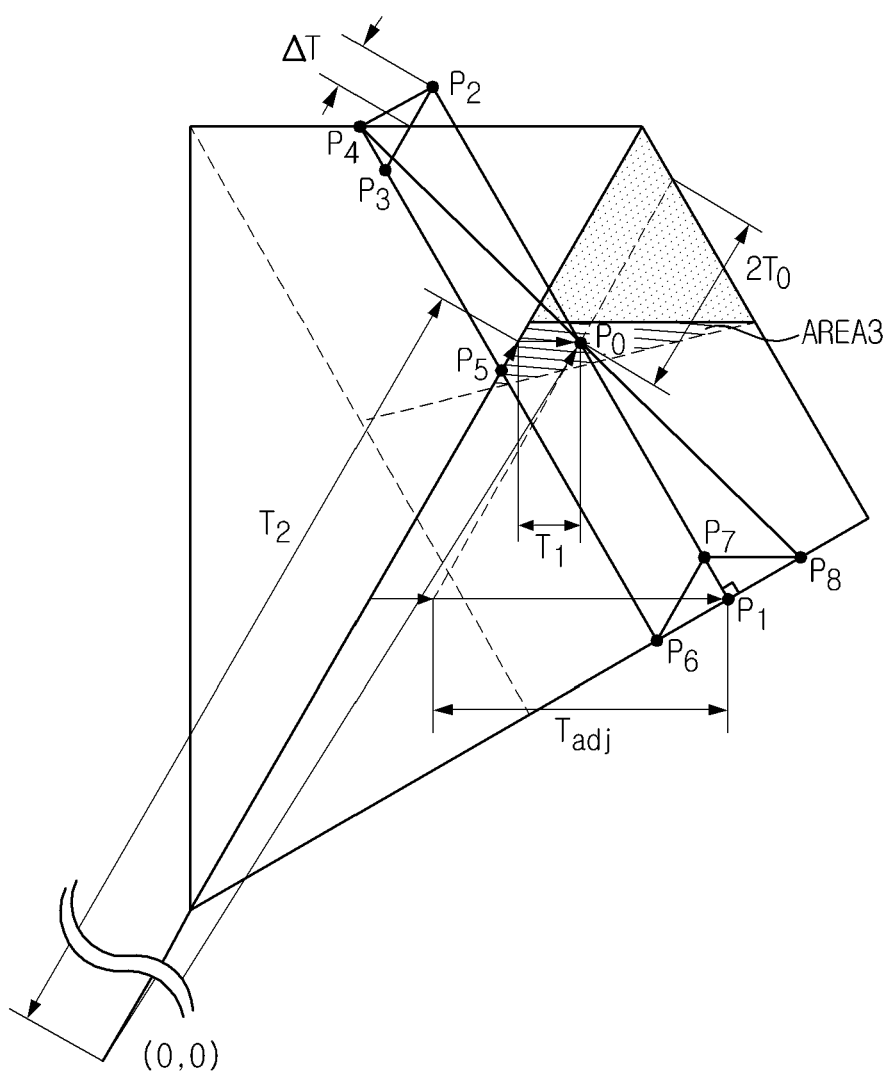
FIG. 23 is an exemplary view illustrating a third area of FIG. 17.
Figure 24:
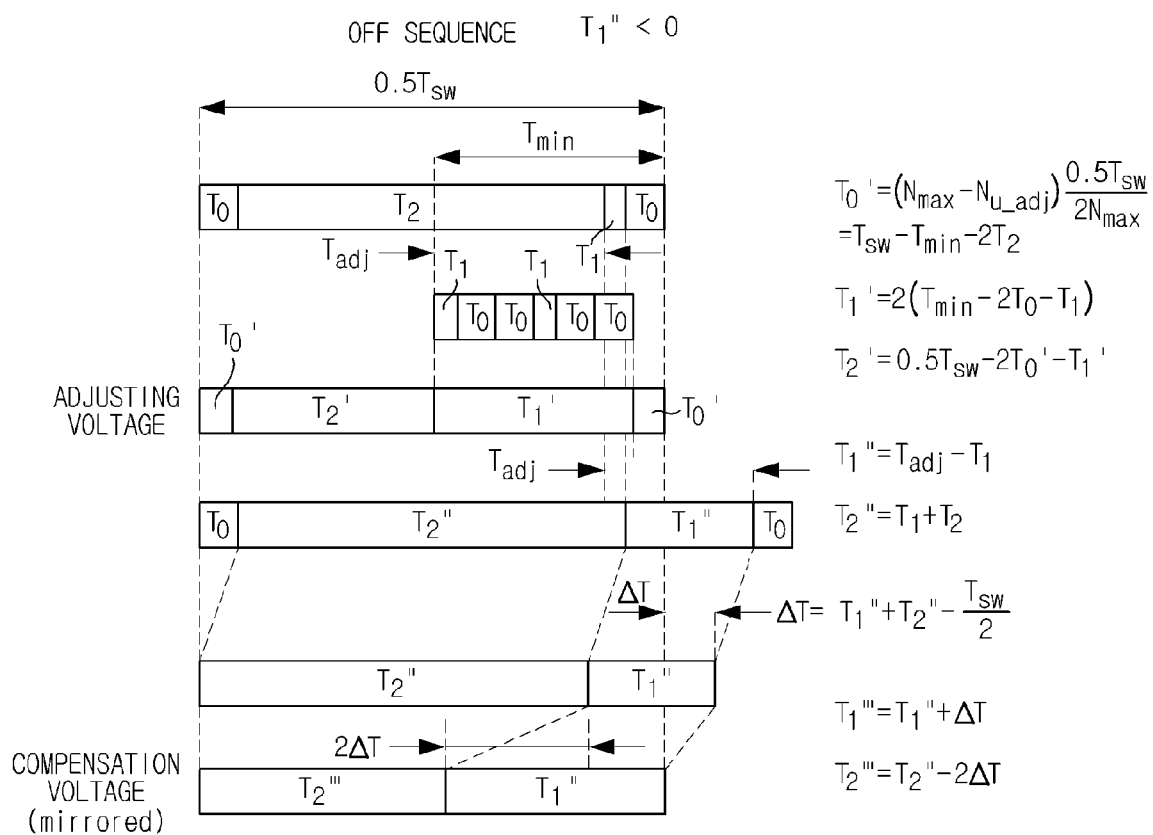
FIG. 24 is an exemplary view illustrating a change at a switching point by modification of voltage command viewed from a third area.

FIG. 23 is an exemplary view illustrating a third area of FIG. 17, and FIG. 24 is an exemplary view illustrating a change at a switching point by modification of voltage command viewed from a third area, where the zero vector application time of the adjusting voltage also changes at the third area. The third area of FIG. 24 is an area where the second area and the third area of FIG. 10 (prior art) are added, and a voltage is calculated by a method where an injection voltage becomes minimum.

A process of calculating an adjusting voltage (P8) and a compensation voltage (P4) is as follows. P0 is an original voltage, from which a point perpendicular to a side as in P1 is calculated. P2 is a point symmetrical to P1 about the P0. P3 is a point where T2 component is reduced as much as $\Delta T$, and P4 is a point where T1 component is lengthened as much as $\Delta T$. P5 is a point where T1 component is reduced to 0. P6 is a point when moved to a current detectable area by drawing a perpendicular. P7 is a point where T2 component is lengthened as much as $2\Delta T$. P8 is a point where T1 component is lengthened as much as $2\Delta T$. P0 to P8 are described in the following Table.

TABLE 5

| | |
|---|---|
| $P_0$ | $(T_1, T_2)$ |
| $P_1$ | $(T_1 + T_{adj}, T_2 - T_{adj})$ |
| $P_2$ | $(T_{adj} - T_1, T_1 + T_2)$ |
| $P_3$ | $P_2 - (0, 2\Delta T) = (T_{adj} - T_1, T_1 + T_2 - 2\Delta T)$ |
| $P_4$ | $P_3 + (\Delta T, 0) = (T_{adj} - T_1 + \Delta T, T_1 + T_2 - 2\Delta T)$ |
| $P_5$ | $(0, T_1 + T_2 - 2\Delta T) = (0, T_2')$ |
| $P_6$ | $(T_{min} - 0.5(0.5T_{sw} - T_2'), T_2' - (T_{min} - 0.5(0.5T_{sw} - T_2')))$ |
| $P_7$ | $P_6 + (0, 2\Delta T)$ |
| $P_8$ | $P_7 + (2\Delta T, 0) = (2(T_{min} + T_2) - T_{sw}, 2T_2 - 0.5T_{sw})$ |

The present disclosure uses a method of injecting a minimum voltage.

Figure 25:
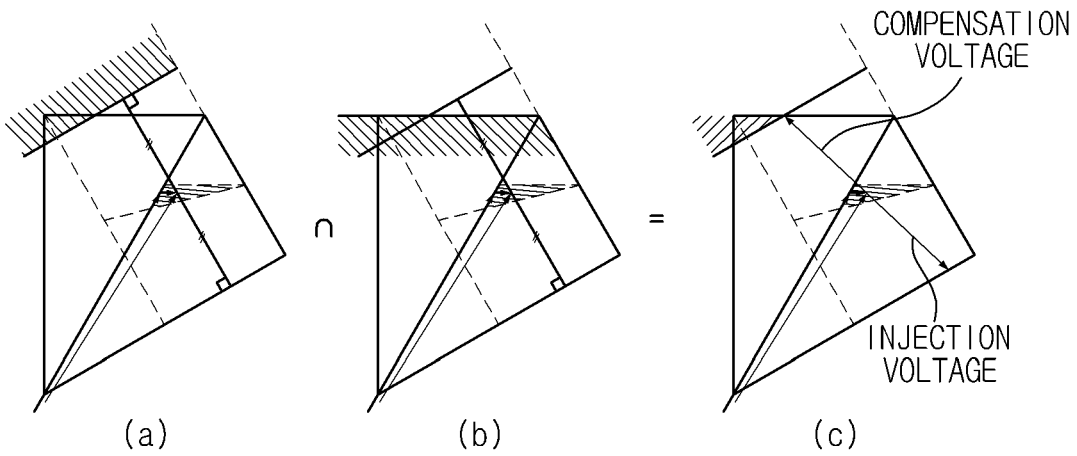
FIG. 25 is an exemplary view illustrating a method for determining an injection voltage and a compensation voltage at a third area.

FIG. 25 is an exemplary view illustrating a method for determining an injection voltage and a compensation voltage at a third area.

It should be apparent that a minimum voltage vector is used because a normal is used to determine the adjusting voltage vector at the first and second areas. The original voltage by the injection voltage at the third area must be from an unmeasureable area (a), and the compensation voltage must exist within a synthesizable hexagon (b). A point closest to the original voltage in an area satisfying the (a) and (b) conditions is determined as in (c).

Thus, a voltage smaller than an injection voltage according to the prior art can be injected to make smaller a current ripple generated by a high frequency injection component over an average voltage.

Figure 26:
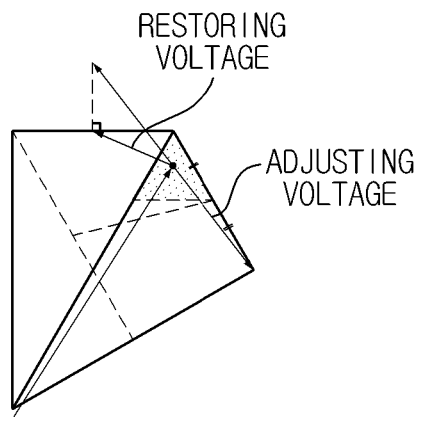
FIG. 26 is an exemplary view illustrating a fourth area of FIG. 17.

FIG. 26 is an exemplary view illustrating a fourth area of FIG. 17.

It is impossible to position an adjusting voltage vector and a restoring voltage vector inside a voltage hexagon in the fourth area. However, an accurate voltage synthesis is sacrificed in order to obtain a minimum sampling time. An adjusting voltage and a restoring voltage at the current detectable area can be determined in consideration of an amount of voltage error as in FIG. 26 according to the present disclosure.

Figure 27:
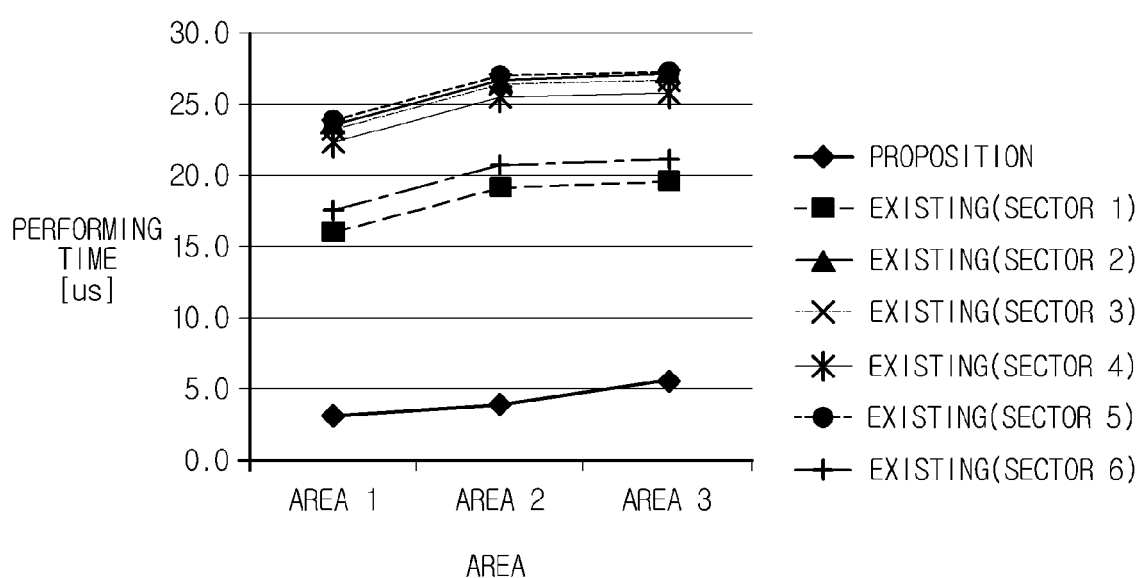
FIG. 27 is an exemplary view comparing a time consumed for modifying a voltage command according to prior art with a time consumed according to the present disclosure.

FIG. 27 is an exemplary view comparing a time consumed for modifying a voltage command according to prior art with a time consumed according to the present disclosure.

Although the conventional calculation time is different depending on each sector due to processes determining the sectors, the present disclosure can have an identical calculation (computation) time regardless of sectors, whereby it can be noted that the computation time can be reduced by ⅓ to ½ over that of the prior art.

As apparent from the foregoing, the present disclosure has an advantageous effect in that a better result can be obtained using a reduced computation over the prior art, and as a result, realization is possible in a slower CPU. This is because the present disclosure can perform a necessary computation using addition, deduction and shift computation free from division calculation. Furthermore, the present disclosure is advantageous in that a constant computation time is consumed regardless of sector, size of injection voltage at a third area can be minimized and a current sampling is not interrupted by addition of a fourth area.

While the present disclosure may have been disclosed with respect to several exemplary embodiments, such features or aspects may be variably modified by those skilled in the art, provided they come within the scope of the appended claims. The present disclosure may, however, be embodied in many different forms and should not be construed as limited to the embodiments set forth herein. Thus, it is intended that embodiments of the present disclosure may cover the modifications and variations of this disclosure provided they come within the metes and bounds of the appended claims and their equivalents.

What is claimed is:

1. An apparatus for modifying voltage command for detecting output current in inverter, the apparatus comprising:
   a first determiner configured to determine a sector in a voltage hexagon that is output voltage vectors corresponding to switch states defined by the voltage hexagon, the sector having a PWM voltage command therein, by comparing each of 3-phase components in the PWM voltage command, and determine a maximum voltage, an intermediate voltage and a minimum voltage at a 3-phase PWM voltage command using the determination of the sector;
   a second determiner configured to determine an area, the area having the PWM voltage command, within a current detection disabled area by converting a minimum sampling time to a minimum sampling PWM and using the converted minimum sampling PWM, wherein the second determiner does not modify the PWM voltage command by determining that the area positioned with the PWM voltage command is a current detectable area, when a voltage deducted of a minimum sampling PWM from a maximum value of PWM triangular wave is greater than or equal to the intermediate voltage; and
   a command modification unit configured to determine an adjusting voltage and a restoring voltage using a minimum injection voltage based on the determined area and to modify the PWM voltage command,
   wherein the adjusting voltage is a modified voltage in an OFF sequence by deducing the minimum injection voltage from the PWM voltage command to move the PWM voltage command out of the current detection disabled area to a current detectable area within the voltage hexagon, the restoring voltage is a modified voltage in an ON sequence by adding the minimum injection voltage to the PWM voltage command to compensate for a difference of the adjusting voltage; and the minimum injection voltage is provided by using a geometry property in the voltage hexagon.

2. The apparatus of claim 1, wherein the second determiner determines the area having the PWM voltage command as a first area when the restoring voltage is smaller than or equal to a maximum voltage.

3. The apparatus of claim 2, wherein the first area is defined by an area where a zero vector application time of the adjusting voltage and the restoring voltage is unchanged.

4. The apparatus of claim 2, wherein the command modification unit determines the adjusting voltage and the restoring voltage by applying each application time of voltage vector to the PWM voltage command by calculating said each application time of voltage vector using geometric nature of the voltage hexagon.

5. The apparatus of claim 1, wherein the second determiner determines the area having the PWM voltage command as a second area when a zero vector application time of restoring voltage is greater than zero.

6. The apparatus of claim 5, wherein the second area is defined by an area where a zero vector application time of the restoring voltage grows smaller than a zero vector application time of PWM voltage command.

7. The apparatus of claim 5, wherein the command modification unit determines the adjusting voltage and the restoring voltage by applying each application time of voltage vector to the PWM voltage command by calculating said each application time of voltage vector using geometric nature of the voltage hexagon.

8. The apparatus of claim 1, wherein the second determiner determines as a third area when a difference between the intermediate voltage and the minimum voltage is smaller than a difference between the twice the maximum value of the PWM triangular wave and the minimum value divided by 2.

9. The apparatus of claim 8, wherein the third area is defined by an area where a zero vector application time of the adjusting voltage also changes.

10. The apparatus of claim 8, wherein the command modification unit determines an injection voltage to allow the minimum voltage to be injected in an area that satisfies a first condition where the PWM voltage command deviates from the current unmeasurable area by the injection voltage, and a second condition where a compensation voltage must exist within a voltage hexagon, and determines the adjusting voltage and the restoring voltage using said determination.

11. The apparatus of claim 8, wherein the second determiner determines as a fourth area when a difference between the intermediate voltage and the minimum voltage is greater than or equal to a difference between the twice the maximum value of the PWM triangular wave and the minimum value divided by 2.

12. The apparatus of claim 11, wherein the command modification unit determines the adjusting voltage and the restoring voltage within the current measurable area in consideration of an amount of voltage error.

13. The apparatus of claim 1, wherein the PWM voltage command is generated by an inverter controller, wherein the inverter controller includes a converter configured to convert a 2-phase voltage command outputted from a 3-phase inverter to a 3-phase voltage command, an application unit configured to convert the 3-phase voltage command to a terminal voltage command using a space vector, a generator configured to generate a PWM voltage command using the terminal voltage command, and a modifier configured to modify the PWM voltage command when the PWM voltage command is positioned at the current detection disabled area within the voltage hexagon.

* * * * *